United States Patent [19]

Lavender

[11] Patent Number: 5,988,719
[45] Date of Patent: Nov. 23, 1999

[54] INTERNAL PIPE PULLING DEVICE

[75] Inventor: Cecil Lee Lavender, Ocilla, Ga.

[73] Assignee: Aeroquip-Vickers, Inc., Maumee, Ohio

[21] Appl. No.: 09/035,457

[22] Filed: Mar. 5, 1998

[51] Int. Cl.[6] .................................................. B66C 1/56
[52] U.S. Cl. ............................................................ 294/96
[58] Field of Search ................................ 294/93, 94, 96, 294/86.12, 86.24, 86.25, 89, 102.1; 285/258

[56] References Cited

U.S. PATENT DOCUMENTS

| | | | |
|---|---|---|---|
| D. 256,544 | 8/1980 | Hintze . | |
| 1,625,909 | 4/1927 | Price | 294/96 |
| 1,897,561 | 2/1933 | Manucci et al. | 294/94 |
| 2,184,681 | 12/1939 | Osmun et al. | 294/96 |
| 2,487,456 | 11/1949 | Lowrey | 294/96 |
| 2,939,739 | 6/1960 | Grunsky | 294/96 |
| 3,036,855 | 5/1962 | Siracusa | 294/94 |
| 3,492,032 | 1/1970 | Deike | 294/94 |
| 3,507,028 | 4/1970 | Stellatella . | |
| 3,662,451 | 5/1972 | Wagner . | |
| 3,709,546 | 1/1973 | Vaughan | 294/96 |
| 3,902,236 | 9/1975 | Deem . | |
| 4,095,335 | 6/1978 | Lassarat . | |
| 4,299,531 | 11/1981 | Seale et al. . | |
| 4,571,802 | 2/1986 | Calhoun et al. . | |
| 4,659,126 | 4/1987 | Breck et al. | 294/93 |
| 4,746,158 | 5/1988 | Fields | 294/94 |
| 5,094,496 | 3/1992 | King, Sr. | 294/96 |
| 5,138,754 | 8/1992 | Casteel et al. . | |
| 5,168,623 | 12/1992 | Rabe . | |
| 5,190,334 | 3/1993 | Sawdon | 294/94 |
| 5,207,730 | 5/1993 | Ruggiero . | |
| 5,439,235 | 8/1995 | Blackwell | 294/94 |
| 5,490,313 | 2/1996 | Ashbrook . | |
| 5,533,246 | 7/1996 | Ashbrook . | |
| 5,621,966 | 4/1997 | Kvenvold et al. . | |
| 5,647,627 | 7/1997 | Baessler | 294/96 |

OTHER PUBLICATIONS

Brochure entitled "SWIPUL Innerduct Swivel/Pulling Eye", published by Dura–Line Corporation, dated 1995.

Brochure entitled "Fixed Head Innerduct Pulling Eyes", Published By Condux International, Inc., dated 1996.

*Primary Examiner*—Dean J. Kramer
*Attorney, Agent, or Firm*—Emch, Schaffer, Schaub & Porcello Co., L.P.A.

[57] ABSTRACT

A pulling device for use with a pipe having an inside wall. The device includes a center slide. The device further includes at least one gripper plate that is adapted to cooperatively engage the center slide to cause the gripper plate to expand outwardly with respect to the center slide. The gripper plate includes a plurality of rings for engaging the inside wall of the pipe. The device further includes a pulling eye attached to the center slide to which a swivel or a cable can be attached to pull the device.

7 Claims, 3 Drawing Sheets

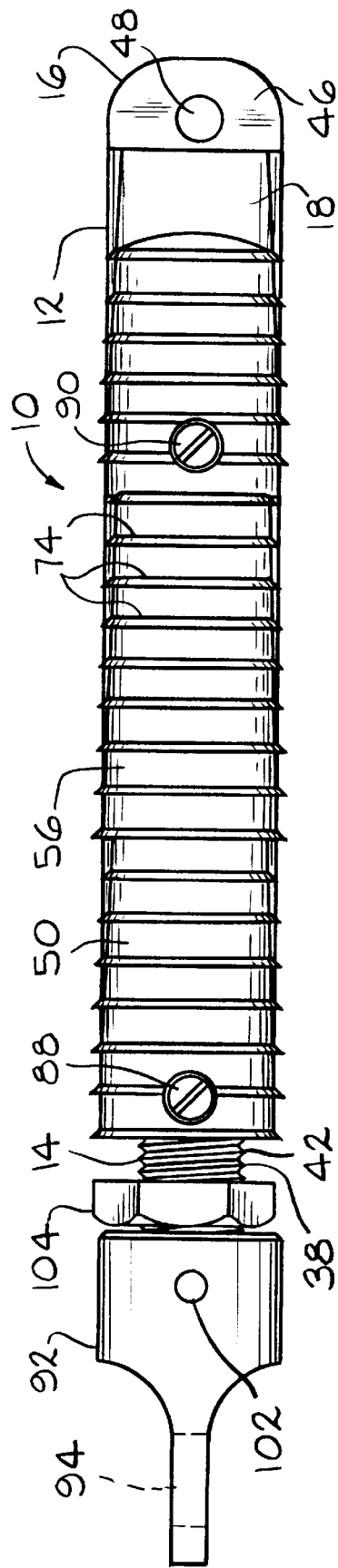
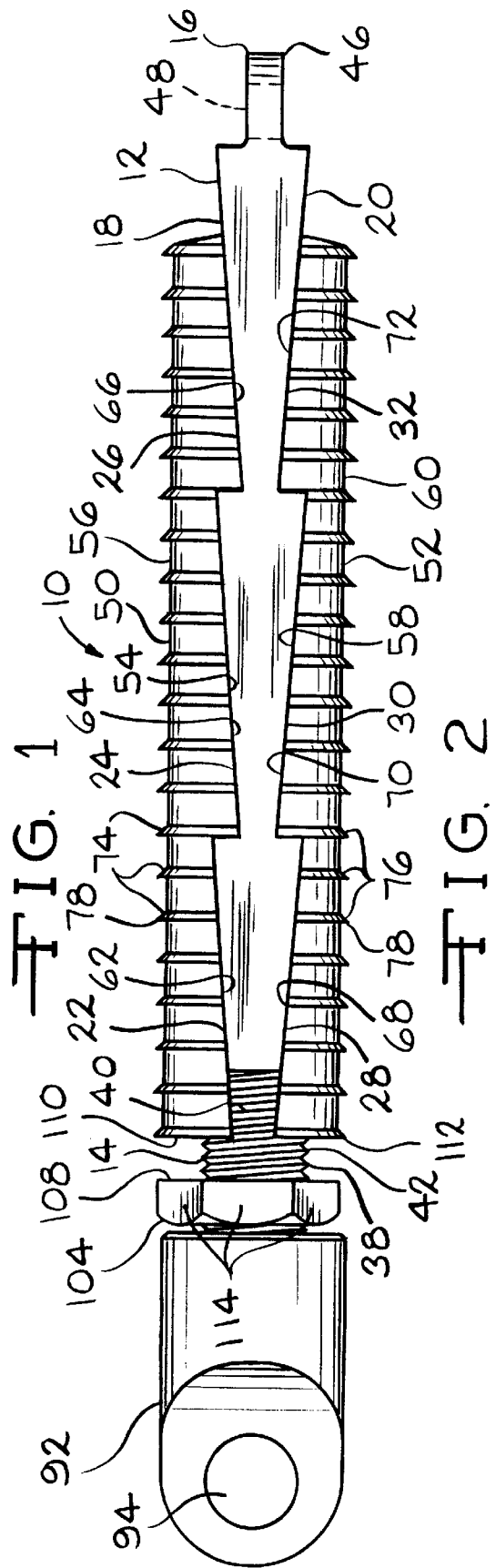

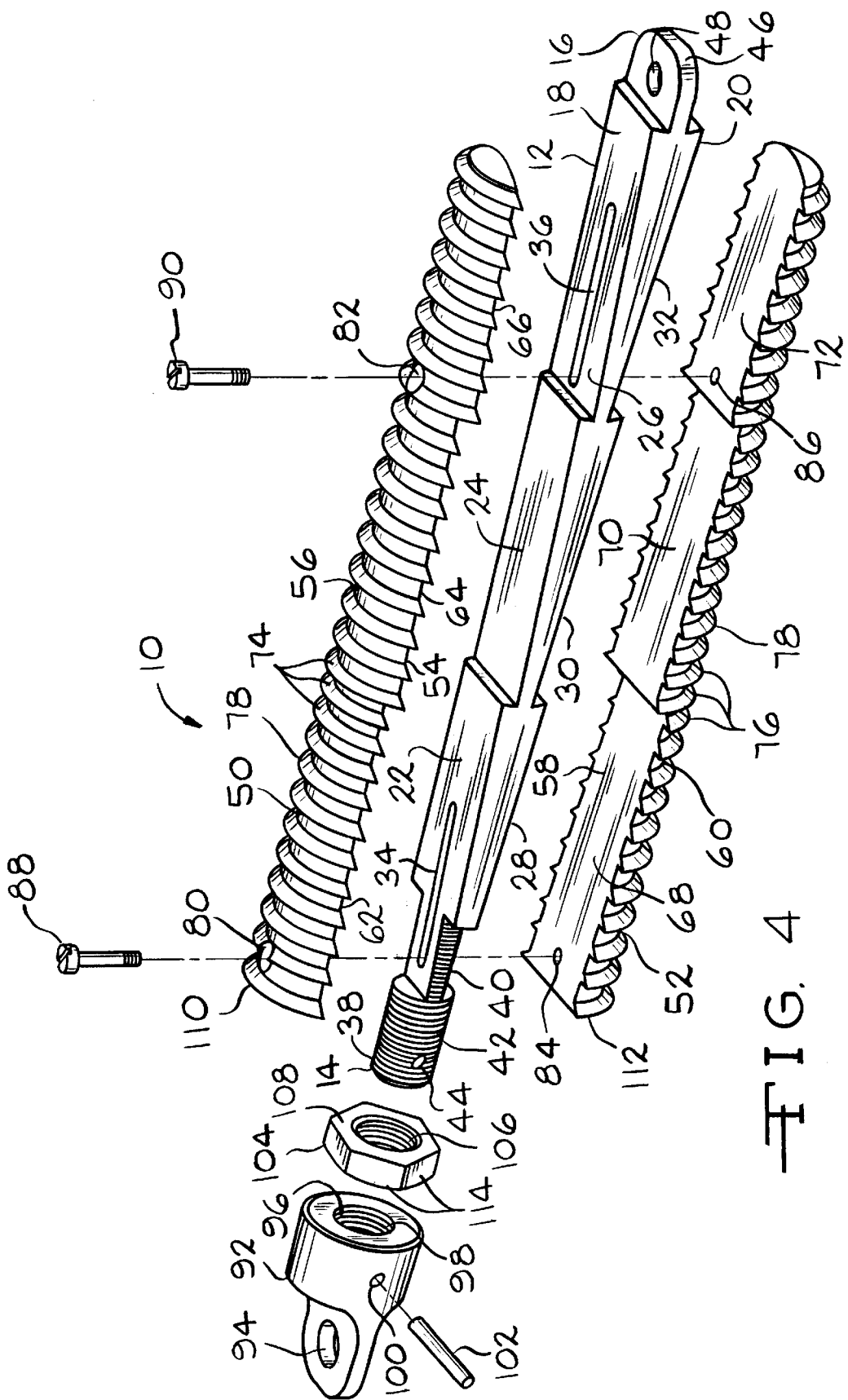

INTERNAL PIPE PULLING DEVICE

BACKGROUND OF THE INVENTION

The present invention relates generally to an internal pipe pulling device. More specifically, the invention is directed to a pulling device that engages an inside wall of a pipe to pull the pipe through conduit or the like.

Pulling devices for pipes are known in the art. For example, there is a pulling device that grips an exterior wall of a pipe. It has been found that this type of device takes up space within the conduit in which the pipe is being pulled. Further, it has been found that this type of device increases the amount of force required to pull the pipe through the conduit. Another type of device includes a pulling eye that is screwed into a pipe. This causes the pipe to expand thereby reducing the amount of clearance in the conduit in which the pipe is being pulled. Therefore, there is a need for an internal pipe pulling device that quickly and efficiently pulls a pipe through conduit.

The internal pipe pulling device of the present invention grips a pipe from the inside causing the least amount of expansion to the pipe. The present invention allows for greater clearance in the conduit in which the pipe is being pulled. Finally, the present invention reduces the amount of force required to pull the pipe through the conduit.

SUMMARY OF THE INVENTION

The present invention is directed to a pulling device for use with a pipe having an inside wall. The device includes a center slide. The device further includes, in a preferred embodiment, two gripper plates that are adapted to cooperatively engage the center slide to cause the gripper plates to expand outwardly with respect to the center slide. Each of the gripper plates includes a plurality of rings for engaging the inside wall of the pipe. The device further includes, in a preferred embodiment, a pulling eye attached to the center slide to which a swivel or a cable can be attached to pull the device.

The primary object of the present invention is to provide an internal pipe pulling device that engages an inside wall of a pipe to quickly and efficiently pull the pipe through conduit.

Other objects and advantages of the present invention will become apparent to those skilled in the art upon a review of the following detailed description of the preferred embodiment and the accompanying drawings.

BRIEF DESCRIPTION OF THE DRAWINGS

FIG. 1 is a top view of the internal pipe pulling device according to the present invention;

FIG. 2 is a side elevational view of the present invention;

FIG. 4 is an exploded view of the present invention.

DETAILED DESCRIPTION OF THE PREFERRED EMBODIMENT

Figure 3:
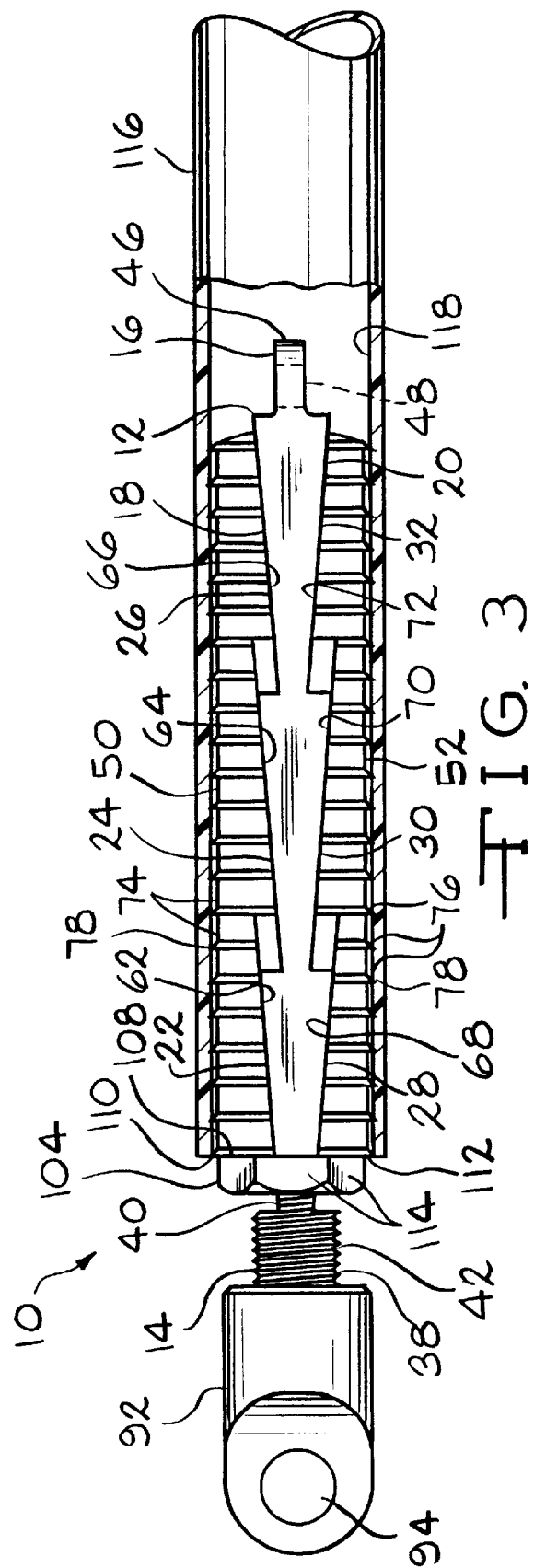
FIG. 3 is a side elevational view of the present invention in which the invention is shown positioned in a pipe.

The preferred embodiment and best mode of the present invention will now be described in detail with reference being made to the drawings. The internal pipe pulling device of the present invention is indicated generally in the drawings by the reference number "10".

Referring to FIGS. 2 and 4, device 10 includes an elongate center slide 12 having a pulling end 14 and a trailing end 16. A top surface 18 and a bottom surface 20 extend between the pulling and trailing ends 14 and 16. In a preferred embodiment, the top surface 18 defines a first top wedge 22, a second top wedge 24 and a third top wedge 26. The bottom surface 20 defines a first bottom wedge 28, a second bottom wedge 30 and a third bottom wedge 32. As shown in FIG. 4, a first elongated slot 34 extends between the first top wedge 22 and the first bottom wedge 28. A second elongated slot 36 extends between the third top wedge 26 and the third bottom wedge 32. Still referring to FIG. 4, the pulling end 14 includes a cylindrical head 38 and a neck portion 40. The head 38 and the neck portion 40 define a plurality of threads 42. The head 38 defines a pin opening 44. As shown in FIGS. 1 and 4, the trailing end 16 includes a projection 46 that defines an opening 48.

Referring to FIGS. 1, 2 and 4, the device 10 includes a top gripper plate 50 and a bottom gripper plate 52. The top gripper plate 50 includes a top gripper inside surface 54 and a top gripper outside surface 56. The bottom gripper plate 52 includes a bottom gripper inside surface 58 and a bottom gripper outside surface 60. As shown in FIGS. 2 and 4, the top gripper inside surface 54 defines a first top inclined surface 62, a second top inclined surface 64 and a third top inclined surface 66. The first, second and third top inclined surfaces 62, 64 and 66 are adapted to cooperatively engage the first, second and third top wedges 22, 24 and 26, respectively. Still referring to FIGS. 2 and 4, the bottom gripper inside surface 58 defines a first bottom inclined surface 68, a second bottom inclined surface 70 and a third bottom inclined surface 72. The first, second and third bottom inclined surfaces 68, 70 and 72 are adapted to cooperatively engage the first, second and third bottom wedges 28, 30 and 32, respectively. As described below, movement of the top and bottom gripper plates 50 and 52 with respect to the center slide 12 causes expansion of the top and bottom gripper plates 50 and 52 outwardly with respect to the center slide 12 due to the wedging action or movement between the inclined surfaces 62–72 and their respective wedges 22–32.

As shown in FIGS. 2 and 4, the top gripper outside surface 56 includes a plurality of spaced top rings 74. The bottom gripper outside surface 60 includes a plurality of spaced bottom rings 76. Each of the rings 74 and 76 includes a sharp edge 78 defined by a predetermined angle in the range from about 40° to about 50°. In a preferred embodiment, as shown in the drawings, the angle is 45°. As described below, the sharp edges 78 of the top and bottom rings 74 and 76 engage an inside wall of the pipe being pulled by the device 10 to firmly grip the pipe.

As shown in FIG. 4, the top gripper plate 50 defines a first top bolt opening 80 and a second top bolt opening 82. The bottom gripper plate 52 defines a first bottom bolt opening 84 and a second bottom bolt opening 86. A first bolt 88 extends through the first top bolt opening 80, the first elongated slot 34 and the first bottom bolt opening 84. A second bolt 90 extends through the second top bolt opening 82, the second elongated slot 36 and the second bottom bolt opening 86. The first and second bolts 88 and 90 allow for the flexible attachment of the top and bottom gripper plates 50 and 52 to the center slide 12. This flexible attachment allows the top and bottom gripper plates 50 and 52 to expand outwardly with respect to the center slide 12 during use of the device 10. In this regard, the first and second bolts 88 and 90 can travel in the first and second elongated slots 34 and 36, respectively, during expansion of the top and bottom gripper plates 50 and 52.

Referring to FIGS. 2 and 4, the device 10 includes at least one pulling eye 92 that defines an opening 94 adapted to receive a swivel, a cable, or the like (not shown). The pulling eye 92 defines a recess 96 that includes a plurality of threads 98. The threads 98 are adapted to mate with the threads 42 defined by the head 38 of the center slide 12. The pulling eye 92 defines a pin opening 100. Once the pulling eye 92 is positioned on the head 38, a pin 102 is inserted through the pin opening 100 of the pulling eye 92 and the pin opening 44 of the head 38. The pin 102 provides for firm attachment of the pulling eye 92 to the center slide 12.

Referring to FIGS. 2 and 4, the device 10 includes at least one jamb nut 104 that defines a plurality of threads 106. The threads 106 are adapted to mate with the threads 42 defined by the head 38 and the neck portion 40 of the center slide 12. The jamb nut 104 includes an engaging surface 108 that is adapted to engage a top gripper end 110 of the top gripper plate 50 and a bottom gripper end 112 of the bottom gripper plate 52. The jamb nut 104 includes a plurality of wrench flats 114. As described below, the jamb nut 104 can be moved with respect to the head 38 and the neck portion 40 to engage the top and bottom gripper ends 110 and 112 to cause the top and bottom gripper plates 50 and 52 to expand outwardly with respect to the center slide 12. During expansion, the top and bottom rings 74 and 76 engage an inside wall of the pipe to be pulled to create a positive set of the top and bottom gripper plates 50 and 52 to the inside wall before the pipe is pulled.

The operation and intended use of the pulling device 10 of the present invention will now be described in detail. Referring to FIG. 3, a tag line (not shown) is attached to the projection 46 of the center slide 12 through the opening 48. The device 10 is then slid into a plastic pipe 116 that has an inside wall 118. As it will be appreciated, the device 10 is sized depending on the pipe in which it will be used. After insertion of the device 10 into the pipe 116, the jamb nut 104 is screwed along the head 38 and the neck portion 40 of the center slide 12 toward the top and bottom gripper plates 50 and 52. The engaging surface 108 of the jamb nut 104 engages the top and bottom gripper ends 110 and 112. This causes the inclined surfaces 62–72 to engage their respective wedges 22–32 to cause the top and bottom gripper plates 50 and 52 to expand outwardly with respect to the center slide 12. The jamb nut 104 is screwed until the sharp edges 78 of the top and bottom rings 74 and 76 firmly engage the inside wall 118 of the pipe 116 to create a positive set between the top and bottom gripper plates 50 and 52 and the inside wall 118. A swivel or cable (not shown) is attached to the pulling eye 92 through the opening 94. The device 10 is then pulled by the swivel or cable. Due to the attachment of the top and bottom gripper plates 50 and 52 to the inside wall 118 of the pipe 116, movement of the device 10 causes corresponding movement of the pipe 116 in the direction in which the device 10 is being pulled. The device 10 is intended to be used to pull pipe through conduit (not shown). Once the pipe 116 has been pulled through the conduit, the pipe is cut adjacent to the trailing end 16 of the center slide 12. The device 10 is removed from the pipe 116 by unscrewing the jamb nut 104 away from the top and bottom gripper plates 50 and 52. The center slide 12 can then be pushed by hand or by tool in the opposite direction from which the device was pulled. This movement releases the top and bottom gripper plates 50 and 52 from the inside wall 118 thereby allowing the device 10 to be removed from the cut section of pipe.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A pulling device comprising:

an elongated center slide having a pulling end and a trailing end, said center slide including a top surface and an opposed bottom surface extending longitudinally between said pulling and trailing ends, said top surface including a first top wedge, a second top wedge and a third top wedge, said bottom surface including a first bottom wedge, a second bottom wedge and a third bottom wedge, said center slide including a first elongated slot extending between said first top wedge and said first bottom wedge and a second elongated slot extending between said third top, wedge and said third bottom wedge, said pulling end having means for pulling said center slide;

a top gripper plate having a top gripper inside surface and a top gripper outside surface, said top gripper inside surface including a first top inclined surface, a second top inclined surface and a third top inclined surface, said first, second and third top inclined surfaces being adapted to cooperatively engage said first, second and third top wedges, respectively, said top gripper outside surface having top gripping means for gripping an inside wall of a pipe being pulled by said device, said top gripper plate including a first top opening and a second top opening;

a bottom gripper plate having a bottom gripper inside surface and a bottom gripper outside surface, said bottom gripper inside surface including a first bottom inclined surface, a second bottom inclined surface and a third bottom inclined surface, said first, second and third bottom inclined surfaces being adapted to cooperatively engage said first, second and third bottom wedges, respectively, said bottom gripper outside surface having bottom gripping means for gripping an inside wall of a pipe being pulled by said device, said bottom gripper plate including a first bottom opening and a second bottom opening;

first fastening means extending through said first top opening, said first elongated slot and said first bottom opening to flexibly fasten said top and bottom gripper plates to said center slide; and second fastening means extending through said second top opening, said second elongated slot and said second bottom opening to flexibly fasten said top and bottom gripper plates to said center slide.

2. The pulling device of claim 1, wherein said first fastening means consists of a first bolt and said second fastening means consists of a second bolt.

3. The pulling device of claim 1, wherein said top and, bottom gripping means each consists of a plurality of spaced rings.

4. The pulling device of claim 3, wherein at least one of said rings defines a sharp edge.

5. The pulling device of claim 1, wherein said means for pulling said center slide consists of at least one pulling eye attached to said center slide.

6. The pulling device of claim 1, wherein said pulling device further includes means for moving said top and bottom gripper plates with respect to said center slide.

7. The pulling device of claim 6, wherein said means for moving said top and bottom gripper plates consists of a first plurality of threads positioned on said center slide and at least one jamb nut having a second plurality of threads in mating relationship with said first plurality of threads, said at least one jamb nut being adapted to engage said top and bottom gripper plates to cause said top and bottom gripper plates to expand outwardly with respect to said center slide.

* * * * *